United States Patent Office 3,433,742
Patented Mar. 18, 1969

3,433,742
POLYBUTENE-1 BEARING COMPOSITIONS
AND METHOD
Edward M. Banta, Baytown, Tex., assignor to Petro-Tex
Chemical Corporation, Houston, Tex., a corporation
of Delaware
No Drawing. Filed Oct. 26, 1967, Ser. No. 678,198
U.S. Cl. 252—12                                   16 Claims
Int. Cl. C10m 7/04, 7/06, 7/14

ABSTRACT OF THE DISCLOSURE

Method for supporting at least one moving surface; novel polybutene-1 compositions containing lubricants such as graphite, molybdenum sulfide and disulfide are disclosed.

BACKGROUND OF THE INVENTION

The present invention relates to novel butene-1 polymer compositions containing specific lubricants and to the use of these compositions for supporting moving surfaces. More particularly, the invention relates to novel polybutene-1 compositions containing graphite, molybdenum sulfide and molybdenum disulfide, and the use of such compositions as bearing materials.

The need has arisen in recent years for a low-cost support or bearing material suitable for use in low pressure, low velocity applications. While previously polyethylene compositions have been given consideration for these applications, indications of superior durability and resistance to cold flow by intermediate or high density polybutene-1 have stimulated interest in its potential use for these purposes. However, while polybutene-1 has excellent durability and resistance to wear, its potential use as a bearing material is limited by other considerations.

SUMMARY OF THE INVENTION

According to the present invention, the number of useful applications for polybutene-1 as a support material for moving surfaces have been increased substantially by the incorporation of specific lubricating substances into the polymer. While it is not intended to limit the invention to any particular theory, it appears that the lubricating material renders the polybutene-1 composition self-lubricating or substantially self-lubricating. An additional feature of the invention is the improvement in extrusion characteristics of the polymer.

DESCRIPTION OF THE INVENTION

In general, the polymers employed in the invention are primarily isotactic polybutene-1 polymers having intermediate to high density and generally having a molecular weight of from about 450,000 to 750,000 on a weight average basis. The preferred polymers may be characterized further as containing more than 50 percent ether insolubles, having a density within the range of about 0.88 to about 0.92 (grams/cc. at 25° C.) (ASTM D 1238–57T), a melt index of from about 0.1 to about 5 (ASTM D 1238–57T), a yield strength of from about 1800 to about 3200 p.s.i. (ASTM D 638–58T), and a tensile strength of between about 3000 p.s.i. to about 6000 p.s.i. (ASTM D 638–58T modified). The melt index of such polymers at 190° F. is generally between 0.2 and 2.0 (ASTM D 1238–57T), with a Shore D hardness of between about 60 and 73 (ASTM D 1706–59T) and an elongation percent of between 200 and 400 percent (ASTM D 638–58T modified).

The preparation of the polybutene-1 polymer per se forms no part of the present invention and complete descriptions of process for preparation of these polymers may be found in U.S. Patent No. 3,184,442 to Nagel, issued May 18, 1965, and U.S. Patent No. 3,190,866 to Nagel et al., issued June 22, 1965. The novel compositions of the invention, however, may be prepared by physical incorporation of the lubricant into polymers of the type described, as for example, by blending the materials on a rubber mill. The compositions may then be formed into bearing structures in any suitable manner, such as by molding, extruding, or casting. A more detailed description of the preparation of the novel compositions of the present invention is given hereafter.

The amounts of the lubricants employed in the compositions and method of the invention may be varied within a wide range of proportions, the only requirement being that sufficient amounts be employed to achieve good lubricity, i.e., lubricating amounts. Normally there will be from about 0.1 percent to 35.0 percent of the lubricant based on the weight of polybutene-1 present (although in the case of molybdenum disulfide, up to 50 weight percent may be used), with a lubricant content of from about 0.5 percent to about 28 percent representing a preferred content. A lubricant content of from about 0.5 percent to about 25 percent by weight gives excellent results. Mixtures of the lubricants may be utilized, the mixtures being used in amounts corresponding to that employed with the individual lubricants.

As noted, lubricants which are particularly effective are graphite, molybdenum sulfide, and molybdenum disulfide. Graphite is preferred.

Example I

Approximately 352 grams of a primarily isotactic, intermediate density polybutene-1 polymer having a molecular weight of from about 450,000 to 750,000 on a weight average basis were fed on to a heated two-roll rubber mill maintained at a temperature sufficient to melt the polymer, i.e., approximately 325° F. After the polymer was melted, sufficient graphite to make the final product 23 percent by weight graphite, i.e., about 104 grams, was added to the molten polymer. The mixture was then milled for approximately fifteen minutes to achieve uniform dispersion of the graphite. The mixture was allowed to cool on the rubber mill and then was removed and allowed to cool further for about ten to fifteen minutes. The solidified product was then ground to reduce the size of the compound to small chunks about ⅛" to ⅙" in size and was then fed into a small extruder where the barrel heat was maintained at a constant 350° F. The product was extruded into a semi-positive, flashing mold and the mold was placed in a preheated press at 325° F. for approximately thirty minutes under minimum pressure. The heat was then turned off and the mass allowed to cool. During this stage moderate pressure was applied until the plastic mass was sufficiently cooled to permit increasing the pressure to approximately 25 tons of ram force without causing appreciable plastic flow out of the mold. The cylindrical disc product was then cooled to 120° F. under the above pressure. After aging for ten days, the composition is found to have good bearing characteristics and has good self-lubrication.

Example II

The procedure of Example I is repeated using 8 percent by weight molybdenum disulfide as a lubricant. Good bearing characteristics are obtained in the product material.

Example III

The procedure of Example 1 is repeated using 4 percent by weight molybdenum sulfide instead of the graphite. The material exhibits good bearing characteristics.

If desired, other materials such as fillers and reinforcing agents may be incorporated into the novel compositions of the invention, it being recognized, of course, that materials which substantially adversely affect the properties of the compositions should not be added. For example, reinforcing agents such as glass and asbestos may be employed. Additionally, other polymers such as polyethylene and polypropylene may be blended in minor proportions, i.e., less than fifty percent of the total compositions. The compositions disclosed herein are admirably suited for use in a variety of bearing types such as journal, thrust, and slide bearings.

While there are above disclosed but a limited number of embodiments of the method and compositions of the invention herein presented, it is possible to produce still other embodiments without departing from the inventive concept herein disclosed, and it is desired therefore that only such limitations be imposed on the appended claims as are stated therein, or required by the prior art.

I claim:

1. A bearing material comprising solid polybutene-1 having a density of from 0.87 to 0.93 gram per cubic centimeter and containing a lubricating amount of a lubricant selected from the group consisting of graphite, molybdenum sulfide, molybdenum disulfide, and mixtures thereof.

2. The material of claim 1 wherein the lubricant is graphite.

3. The material of claim 1 wherein the lubricant is molybdenum sulfide.

4. The material of claim 1 wherein the lubricant is molybdenum disulfide.

5. The material of claim 1 wherein the lubricant is a mixture of graphite and molybdenum disulfide.

6. A bearing material comprising solid polybutene-1 having a density of from 0.87 to 0.93 gram per cubic centimeter and containing from 0.1 percent to 35 percent lubricant by weight based on the weight of the polybutene-1, said lubricant being selected from the group consisting of graphite, molybdenum sulfide, molybdenum disulfide, and mixtures thereof.

7. The material of claim 6 wherein the lubricant is graphite.

8. The material of claim 6 wherein the lubricant comprises molybdenum disulfide.

9. The material of claim 6 wherein the lubricant comprises molybdenum sulfide.

10. The material of claim 6 wherein the lubricant is a mixture of graphite and molybdenum disulfide.

11. The material of claim 7 wherein the graphite is present in an amount of from about 0.5 percent to about 28 percent by weight, based on the polybutene-1.

12. The material of claim 8 wherein the molybdenum disulfide is present in an amount of from about 0.5 percent to about 28 percent by weight, based on the polybutene-1.

13. The material of claim 10 wherein the lubricant is present in an amount of from about 0.5 percent to about 28 percent by weight, based on the polybutene-1.

14. The material of claim 4 wherein the molybdenum disulfide is present in an amount of from about 0.1 to about 50 weight percent, based on the weight of polybutene-1.

15. The material of claim 6 wherein the lubricant is present in an amount from about 0.5% to about 28% by weight based on the weight of the polybutene-1.

16. The material of claim 6 wherein the lubricant is present in an amount from about 0.5% to about 25% by weight based on the weight of the polybutene-1.

References Cited

UNITED STATES PATENTS

| | | | |
|---|---|---|---|
| 2,246,092 | 6/1941 | Gilman | 252—12.4 |
| 2,956,848 | 10/1960 | St. Clair | 252—12 |
| 3,114,708 | 12/1963 | Morway et al. | 252—12 |
| 3,184,442 | 5/1965 | Nagel et al. | 260—93.7 |
| 3,190,866 | 6/1965 | Nagel et al. | 260—93.7 |
| 3,325,405 | 6/1967 | Kamath et al. | 252—12 |

DANIEL E. WYMAN, *Primary Examiner.*

L. VAUGHN, *Assistant Examiner.*